FREQUENCY MODULATION CONVERTER SYSTEM

Filed June 4, 1945 2 Sheets-Sheet 1

INVENTORS.
GEORGE C. SZIKLAI.
SARKES TARZIAN.
BY H. S. Grover
ATTORNEY

INVENTORS
GEORGE C. SZIKLAI.
SARKES TARZIAN.
BY H. S. Grover
ATTORNEY

Patented Oct. 31, 1950

2,528,187

UNITED STATES PATENT OFFICE 2,528,187

FREQUENCY MODULATION CONVERTER SYSTEM

George C. Sziklai, Princeton, N. J., and Sarkes Tarzian, Bloomington, Ind., assignors to Radio Corporation of America, a corporation of Delaware Application June 4, 1945, Serial No. 597,466

8 Claims. (Cl. 250—20)

Our present invention relates generally to conversion systems for frequency modulation (FM) signals, and more particularly to systems for converting FM carrier waves into correspondingly amplitude modulated (AM) signals of a substantially lower carrier frequency.

The present FM signalling band covers a range of 42 to 50 megacycles (mc.), and, therefore, requires receivers capable of being tuned through that high frequency range. The contemporary AM broadcast receiver, designed to operate in the 550 to 1700 kilocycle (kc.) range, requires extensive alteration in order to adapt its circuits for use in the FM band. As a matter of fact, in actual practice a separate FM receiving channel is usually provided thereby increasing the cost of the receiving equipment.

Accordingly, it may be stated that it is one of the main objects of our present invention to provide a relatively simple and inexpensive converter system for translating received FM signals into corresponding AM signals capable of being amplified and detected in any suitable, existing AM broadcast receiver.

It is another important object of our present invention to provide a method of converting a high frequency carrier which is frequency modulated into a carrier having amplitude variations corresponding to the original frequency swing of the FM carrier, but whose converted carrier frequency is sufficiently low to be amplified and detected by usual AM broadcast receivers.

It is a more specific object of our present invention to provide a converter network which utilizes a beam tube of the type disclosed and claimed by George C. Sziklai in application Serial No. 544,939, filed July 14, 1944, now Patent No. 2,470,731, issued May 17, 1949, the beam tube acting to convert received FM signals into variable-width pulses whose width variation is representative of the original modulation of the received FM signals.

Still another object of our invention is to provide a beam tube of the aforesaid Sziklai type, which includes a relatively low frequency oscillator section adapted to vary the potential of the target electrode at a predetermined radio frequency which is substantially lower than the carrier frequency of the received FM signals applied to the discriminator input network of the beam tube and which is modulated by pulses of varying width derived from the received FM signals.

While we have indicated and described several systems for carrying our invention into effect, it will be apparent to one skilled in the art that our invention is by no means limited to the particular circuit organizations shown and described, but that many modifications may be made without departing from the scope of our invention, as set forth in the appended claims.

Figure 4A:
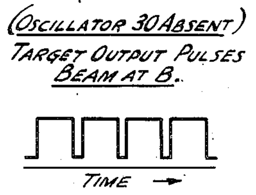
Figure 4B:
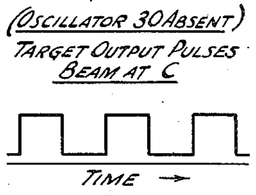
Figure 4C:
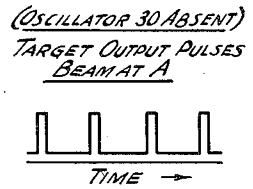
Figure 8:
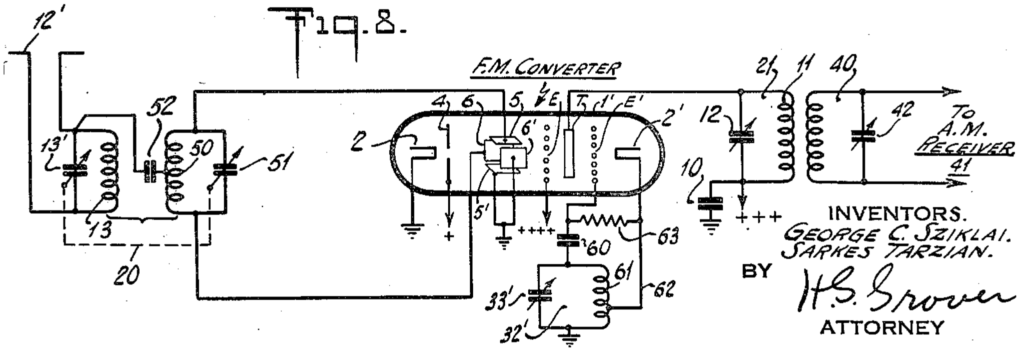
Figures 5, 6, 7:
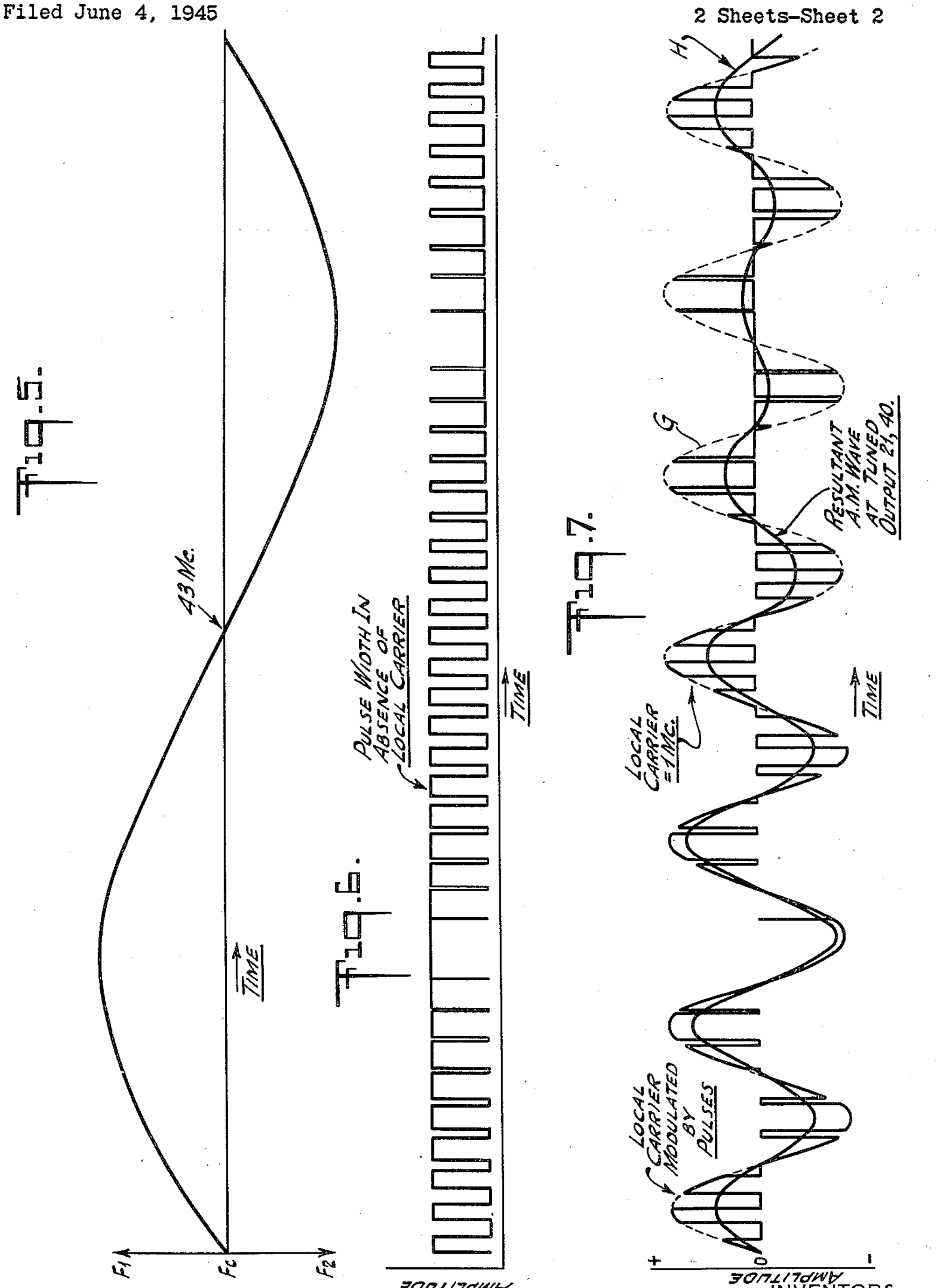

Figs. 3*a*, 3*b*, 3*c* and 3*d* show respectively different appearances of the electron traces, patterns or figures formed on the output or target electrode;

Figs. 4*a*, 4*b* and 4*c* graphically show the wave forms of the output electrode (target) voltage in response to different patterns formed on the target electrode;

Fig. 5 illustrates ideally an FM signal wave over one cycle thereof;

Fig. 6 depicts the variable-width, constant-amplitude pulses that would be formed at target T in the absence of local carrier oscillations;

Fig. 7 illustrates the effect of modulating the local carrier with the pulses of Fig. 6; and Fig. 8 shows a modification of our invention.

Referring now to the accompanying drawings, wherein like reference characters in the different figures designate similar circuit elements, the tube 1 will first be described before explaining the nature of the electrical circuits of the phasing (or discriminator) network which furnish the control voltages for the deflection electrodes. The tube has been described and claimed in copending application Serial No. 544,939, filed July 14, 1944, by G. C. Sziklai. The tube 1 may generally be of the well-known cathode ray oscilloscope type. The tube envelope may be made of glass or metal, and is suitably evacuated. A suitable source of electrons, indicated by numeral 2, is connected to ground. The electron emitter 2 may be a cathode or "gun" of the indirectly-heated type, and is adapted to project or emit a stream of electrons in the form of a beam 3. The beam 3 is schematically represented by a dotted line.

It will be understood by those skilled in the art of cathode ray tube construction that suitable focusing electrodes may be positioned along the path of beam 3 to maintain the normal beam formation along a line terminating at the center of the disc-like target or output electrode T. The numeral 4 designates such a focusing electrode. The electrode 4 is a disc provided with a central aperture through which the beam 3 passes. The electrode 4 is positively biased relative to the grounded electron emitter 2 thereby to function as a beam-forming electrode. Of course, additional beam-forming electrodes could be interposed between electrode 4 and the deflection electrodes. Further, the invention is not restricted to the specific configuration of electrode 4.

The beam 3 normally passes between, and along the central axis of, two pairs of equidistantly spaced deflection plates 5, 5′ and 6, 6′. The spacing between the plates of the respective pairs is equal, and the planes of plates in different pairs are normal to each other. The deflection plates form a deflecting or control area over beam 3 which normally passes along a median line relative to the four plates. Although the deflection plates are shown at the same point along the electron beam, it is to be understood that one pair of plates (say 5, 5′) may be positioned closer to the electron emitter 2 than the other pair as is often done in cathode ray oscilloscopes.

The electrode E is a high voltage, electron-collector electrode. It is shown as consisting of a plurality of concentric metallic rings all conductively connected to each other, and to a source of positive direct current potential through coil S. The potential of electrode E is highly positive relative to the potential of electrode 4. Four plus signs (++++) are employed to indicate that the collector E is highly positive; this is a purely illustrative representation. The electron beam 3 normally passes through the center of the smallest ring, but the beam is capable of passing through the inter-ring spaces in response to appropriate deflection of the beam.

The target or output electrode T is metallic, and is shown as having a circular configuration. The target is also shown spaced from the walls of the tube, although it may be provided as a coating on the inner face of the end of the tube. Electrode T is divided into four effective quadrants or sectors. The sectors are of equal area, and comprise two pairs of diametrically-opposed, secondary electron emission surfaces of different characteristics as to the respective pairs. Thus, sectors 7 and 7′ are of like secondary electron emissivity, and are capable of emitting a copious flow of secondary electrons upon bombardment by the beam of primary electrons 3. The second pair of sectors 8 and 8′ are of like emissivity and are capable of emitting a relatively weak flow of secondary electrons in response to bombardment by primary electrons of beam 3. By way of specific example, sectors 8 and 8′ may be coated with carbon to provide surfaces of low secondary emission ratio. The sectors 7 and 7′ may be coated with caesium oxide to provide surfaces of high secondary emission ratio.

The diameter of target T may be substantially greater than that of collector E so that all the primary electrons passing through the collector inter-ring spaces will impinge on the target. The specific materials described above for the high and low secondary emission surfaces need not be employed, but may be replaced by any other suitable materials capable of functioning as required.

When the beam 3 is deflected in such a way that the electrons thereof land on the low secondary emission surfaces 8 and 8′ of target T, only a relatively small number of secondary electrons leave the target. On the other hand when the beam is deflected so that its electrons hit the high secondary emission areas 7 and 7′, a large number of secondary electrons leave the target. The target is shown as being normally maintained at a positive direct current potential which is substantially less than the direct current voltage of collector E. The direct current source 9 is depicted as having its negative terminal grounded, while the positive terminal (+++) is connected to target T through the coil 11 of resonant output circuit 21. Coil 11 is shunted by tuning condenser 12 which can be adjusted to tune circuit 21 to a desired frequency. The condenser 10 bypasses the direct current source 9 to ground, and should have a value such as to bypass all high frequency components except the 1 mc. carrier, which will hereinafter be further discussed. Normally, and with no alternating voltage applied to deflection plates 5, 5′ and 6, 6′, the electron beam lands at the center of the disc target T, i. e., at the intersection point of the sector division lines.

We have shown the cathode ray tube 1 connected in an FM receiving system to function as an FM converter. The FM converter is assumed to be operatively employed in the 42 to 50 megacycle (mc.) band, the present FM broadcast band. In that band each carrier frequency is varied at the transmitter in accordance with modulation signals. The extent of frequency variation is a function of modulation signal amplitude, while the rate of variation is dependent upon the modulation frequencies per se. The permissible frequency deviation, in accordance with present broadcast transmitting standards, is a maximum of 75 kilocycles (kc.) to each side of the carrier frequency. Our invention is not restricted to the FM range of 42–50 mc., nor to FM reception, nor to the specific overall frequency swing of 150 kc. For example, it has been proposed to shift the present 42–50 mc. band to 80–110 mc. Our invention contemplates operation in any frequency range employing FM transmission. The term "angle-modulated" is to be understood as including phase-modulated (PM) carrier waves, FM carrier waves, or hybrid modulations of PM and FM possessing characteristics of each.

Figures 1, 2:
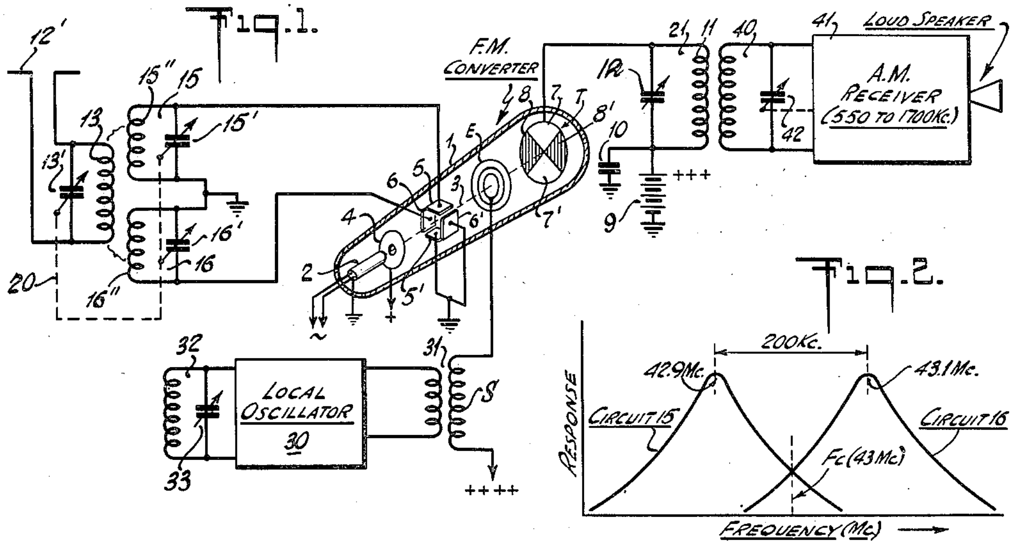
Fig. 1 shows an FM conversion system embodying the invention for use with an AM broadcast receiver, the converter tube envelope being broken away to show the tube interior.
Fig. 2 illustrates typical resonance curves of the discriminator section of the FM converter tube at a desired station setting of the selector device.

The numeral 12′ in Fig. 1 designates a dipole, but it may be a signal collector of any suitable type. It includes a coil 13 coupled electromagnetically to the resonant circuits 15 and 16. These latter circuits cooperate to provide the discriminator network of the converter. The secondary circuits 15 and 16 are preferably free of coupling therebetween. The junction of the secondary circuits 15 and 16 is established at ground potential for FM signal currents. The circuits 15 and 16 are tuned to respectively opposite sides of a desired FM station carrier frequency value, and the frequency spacings between the resonant frequency of each secondary circuit and the desired FM station carrier frequency are preferably equal.

In Fig. 2 are graphically represented typical resonance curves of secondary circuits 15 and 16 at an assumed carrier frequency of 43 mc. Circuit 15 has a peak frequency of 42.9 mc., while circuit 16 has a peak frequency of 43.1 mc. Hence, the peak spacing is 200 kc., which is substantially in excess of the overall maximum frequency swing of 150 kc. The curves of Fig. 2 cross over at 43 mc., the assumed center frequency ($F_c$) of the applied FM signal waves. The circuits 13, 15 and 16 provide a form of frequency discriminator of well-known characteristics. Our invention is not limited to this specific form of discriminator, since other discriminator circuits, e. g., those shown by S. W. Seeley in his U. S. Patent No. 2,121,103, granted June 21, 1938, may be used to supply the deflection voltages for tube 1, as shown in Fig. 5.

The functioning of the discriminator of the present application is well-known. Instantaneous deviations of frequency from the center or reference frequency $F_c$ (the selected FM station carrier frequency value) cause corresponding increases or decreases of signal voltage across the respective secondary circuits 15 and 16. For example, should the frequency of the signal energy instantaneously deviate to 42.925 mc., there will be maximum (for the assumed maximum frequency swing) radio frequency voltage built up across the circuit 15 while minimum voltage exists at circuit 16. Conversely, an instantaneous shift of signal frequency to 43.075 mc. results in maximum radio frequency voltage being developed across circuit 16, with minimum voltage across circuit 15. At the frequency value $F_c$ the voltages across circuits 15 and 16 are equal. Hence, by connecting plate 5 to the high potential side of circuit 15, and opposite plate 5′ to ground, any radio frequency voltage across circuit 15 will be applied between plates 5 and 5′. Similarly, the plate 6 is connected to the ungrounded side of circuit 16, while plate 6′ is grounded. Accordingly, voltage across circuit 16 is applied between plates 6 and 6′.

Each of the resonant circuits includes a respective tuning device 15′ and 16′. By way of illustration they are shown as variable condensers, although the coils 15″ and 16″ may have the inductance values thereof varied by suitable respective iron cores, if desired. Further, the condenser rotors are mechanically coupled for unicontrol adjustment by any suitable device so as concurrently to adjust the frequencies of circuits 15 and 16 to different frequencies while constantly maintaining the 200 kc. spacing between the circuit frequencies. For improved station selection the coil 13 may be shunted by its own variable condenser 13′, so that coil 13 would also be tunable through the range of $F_c$ values. The dash line 29 denotes symbolically a station selector device which is constructed to "track" the condensers 15′, 16′ and 13′ so as to maintain the relation shown in Fig. 2, while selecting a desired FM station. Those skilled in the art of constructing superheterodyne receivers are well acquainted with the manner of "tracking" tunable circuits of different frequency ranges. Known push-button selector devices may be used, if desired.

The amplitude variations in the voltages across circuits 15 and 16 are respectively applied to deflection plates 5, 5′ and 6, 6′. The variations in deflection voltage control the electron beam 3, and cause the beam to sweep or trace figures or patterns over the inner face of target T. It will now be seen that the discriminator network derives from the angle modulated carrier waves (specifically FM carrier waves) a pair of radio frequency voltages whose relative amplitudes are a function of the direction and degree of angular deviation of the waves relative to a reference phase or frequency value, and that the pair of voltages is employed to control the path of an electron beam normally positioned to impinge the target T at the center thereof.

Figure 3A:
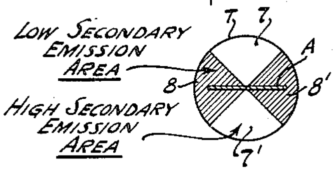
Figure 3B:
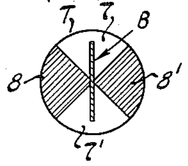
Figure 3C:
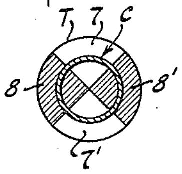
Figure 3D:
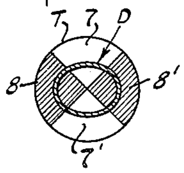

In Figs. 3*a*, 3*b*, 3*c* and 3*d* there have been shown, in an illustrative manner, various electron patterns or traces formed on the target T by the beam. The figures are derived from the aforesaid Sziklai application. When the frequency of the collected FM signals at antenna circuit 13 has a value of 43.075 mc., near to the resonant frequency of circuit 16 the voltage between plates 6 and 6′ will be a maximum, and the voltage between plates 5 and 5′ will be substantially zero. This results in the horizontal trace A of Fig. 3*a*, since the electron beam 3 will be deflected between the horizontal plates 6 and 6′ and the vertical plates 5 and 5′ will exercise substantially no effect on the beam. Assume, now, that the frequency instantaneously deviates near to the peak frequency of circuit 15; the vertical plates 5 and 5′ will then produce the vertical trace B of Fig. 3*b*. The circular trace of Fig. 3*c* will be produced in response to the selected FM signal energy having a center or carrier frequency of $F_c$. Since the deflection voltages are necessarily equal at this center frequency, and since they are in phase quadrature as well, the electron beam will be caused to trace the circular path C over the target sectors. An elliptical trace results when the deflection voltages are unequal and the instantaneous frequency of applied signal energy is at a value between one limiting frequency (42.925 or 43.075 mc.) and $F_c$. In Fig. 3*d* the horizontal axis of the ellipse is greater than the vertical axis thereby signifying that the horizontal plates 6 and 6′ have a greater voltage difference than vertical plates 5 and 5′.

Considering, now, the manner in which the electron beam deflections are translated into target current variations, assume first that the circular trace C is being produced in response to the FM signal wave at antenna circuit 13 having an instantaneous frequency $F_c$. The electron beam traverses all of the target sectors uniformly, and at a uniform rate. Hence, secondary electrons are cause to be emitted from the sectors 7, 8, 7′ and 8′ in that alternate order. Accordingly, the target output current, and consequently the output voltage, will follow the idealized square wave form shown in Fig. 4*b* in the absence of oscillatory voltage from oscillator 30, to be described below. That the target output voltage follows the wave form of Fig. 4*b* is seen from the following considerations, the effect of oscillator 30 being disregarded for the moment.

During the time that beam 3 sweeps across the high secondary emission sector 7 there will be a relatively large flow of secondary electrons from sector 7 to the highly positive collector electrode E. Hence, the target T will become relatively more positive since the electrode E diverts electron current from it, and thereby lessens the voltage drop across resonant output 21. This is, also, true when the beam sweeps over sector 7′. During the sweep periods over 7 and 7′, then, the target will be highly positive thereby approaching the potential of collector E. These periods of target voltage are represented by the successive square peaks of the wave form of Fig. 4*b*. The intermediate valleys of the wave form correspond to the periods when beam 3 sweeps over sectors 8 and 8′.

Since the sectors 8 and 8′ are low secondary electron emission areas, they will emit relatively few secondary electrons to collector E in response to the primary electrons of beam 3. This means that more negatively charged primary electrons will be arriving at target T than secondary negative electrons are lost by the target. Hence, there will be a relatively large flow of current to the target through the coil 11, and the target voltage tends to approach the potential of emitter 2 for the periods when beam 3 sweeps over sectors 8 and 8'. It will now be seen that whereas the target current decreases sharply during periods when the beam sweeps sectors 7 and 7' with resultant sharp increase in target voltage, the target current increases sharply during the sweeping of sectors 8 and 8' with resultant sharp decrease in target voltage.

It has been found that when the electron beam sweeps over the target T it produces a narrow pulse when it passes the center of the target. Even when it sweeps over the target horizontally as in Fig. 3*a*, or vertically as in Fig. 3*b*, it produces a narrow pulse in a positive or negative sense respectively. The reason for the creation of these pulses is believed to be that the electron beam, due to its finite diameter, impinges on both sectors 7, 7' and 8, 8' at the central, cross-over point.

The wave forms shown at Figs. 4*a* and 4*c* show idealized wave forms of the target output pulses for the beam at B and A respectively, it still being assumed that oscillator 30 is ineffective. In other words, the current flowing in output circuit 21 will have the narrow pulse wave form illustrated in Fig. 4*c* when the electron beam 3 sweeps over mainly the low secondary emission area 8, 8' as shown in Fig. 3*a*, the narrow positive pulses occurring during the relatively short interval when the electron beam impinges on area 7 or 7'. These pulses are high frequency pulses of frequency approaching 43.075 mc. The change in pulse width from that shown in Fig. 4*b* to that of Fig. 4*c* depends on the frequency modulation of the carrier. The pulse wave form corresponding to the sweep of beam 3 over mainly the high secondary emission area 7 and 7' (Fig. 3*b*), resulting from frequencies approaching 42.925 mc. is depicted in Fig. 4*a*. The spaces between the positive square areas correspond to relatively short intervals when the electron beam impinges on area 8 or 8'.

In the absence of the local oscillator or carrier source 30 varying the voltage of electrode E, the frequency of pulse repetition, or pulse rate, will depend on the received carrier frequency. However, in accordance with our invention, the oscillator 30, of any suitable and known construction, is used to vary the potential electrode E at a high frequency. The oscillator 30 is coupled by transformer 31, including secondary coil S, to the circuit of electrode E. If desired, the tank circuit 32 of the oscillator 30 may include a variable frequency selector condenser 33. Assume, for example, that condenser 33 is adjusted to tune the oscillator 30 to produce oscillations at 1 mc. (1000 kilocycles).

There will then be produced in the resonant output circuit 21 AM signals, whose carrier frequency is 1000 kc. These AM signals are modulated according to the variable-width areas of the pulses caused in response to the sweep of the beam 3 over the quadrants of target T. As the potential of the electrode E is varied at 1000 kc., the potential of the target T varies at the same rate. Hence, the oscillator 30 may be said to have introduced a lower frequency carrier (1000 kc.) which has been amplitude modulated in accordance with the beam deflections produced by the received FM waves. This pulse-amplitude modulated 1000 kc. wave is readily handled by an AM receiver.

In order more clearly to explain the conversion of the FM signals to the AM signals at circuit 21, the explanatory and illustrative curves of Figs. 5, 6 and 7 are referred to. In Fig. 5 there is depicted the frequency variation of an FM signal during an assumed one cycle period. The center or carrier frequency is 43 mc., and the limiting frequencies are $F_1$ and $F_2$. The corresponding pulses produced at target T are illustrated in Fig. 6. It will be seen that at $F_c$ the pulse areas and spaces are equal, as explained in connection with Fig. 4*b*. At one limiting frequency the pulse areas are of maximum width (Fig. 4*a*), while at the other limiting frequency they are of minimum width (Fig. 4*c*). It is emphasized that the pulses are shown in purely illustrative form in Fig. 6, and are not to be considered as a precise representation of the pulses at target T in the absence of oscillatory voltage from source 30.

In Fig. 7 we have shown the effect of varying electrode E at the frequency of local source 30. The pulses of Fig. 6 amplitude modulate the carrier of 1000 kc., and the curve G (shown dotted) represents the local carrier amplitude modulated by the pulses. In receiving frequencies of the order of 43 mc. there will, of course, be many more pulses within one cycle of envelope G than the six pulse representations shown to preserve simplicity of drawing. The resultant AM signal wave of 1 mc. is represented by solid line curve H. The curve H is derived by integrating the pulse areas under curve G. The circuits 21 and 40, being tuned to 1000 kc. (or 1 mc.) select the AM signal represented by curve H. All other signal components (43 mc. or beats) are rejected by the network 21, 40.

The AM receiver 41 may be of any suitable construction; for example, it may be a superheterodyne receiver adapted to receive AM broadcast signals in the 550 to 1700 kc. band. The selector input circuit 40 is coupled to coil 11 of resonant output circuit 21, and is adjusted by the usual receiver tuning device 42 to the resonant frequency (1000 kc.) of circuit 21. In other words, the AM receiver has its usual station selector device adjusted to receive an AM broadcast signal of the frequency of oscillator 30. Hence, oscillator 30 may be set to generate oscillatory voltage at any frequency in the range of selector devices 12 and 42, to wit: 550 to 1700 kc., with a usual AM broadcast receiver. Once the oscillator tuning device 33 is adjusted to tune the oscillator tank circuit 32 to a desired frequency in the 550 to 1700 kc. range of receiver 41, each of frequency selector devices 12 and 42 is adjusted so as to set the frequency of circuit 21 and the receiver selector circuits (40) respectively to the oscillator frequency.

The normal detector or demodulator employed in the AM receiver 41 will readily demodulate the AM signals at input circuit 40. For example, if the second detector of receiver 41 is a simple diode rectifier circuit, the usual diode load resistor will have developed thereacross modulation signals which correspond to the modulation of the received FM radio signals. The loudspeaker of the receiver 41 will reproduce such modulation signals. To select different FM stations in the FM band of 42–50 mc., it is only necessary to adjust selector 20 to the FM carrier frequency desired.

In Fig. 8 we have shown a modified converter system, wherein the beam tube 1′ incorporates the electrodes of the oscillator 30. Furthermore, the modification in Fig. 8 differs from the system shown in Fig. 1 in that the discriminator input network of the beam tube is constructed in accordance with the teaching of the aforesaid Seeley patent. The signal collector 12′ has its coil 13 magnetically coupled to the input coil 50, and the latter coil is shunted by the variable condenser 51. The variable condensers 13′ and 51 are concurrently adjusted to tune their respective resonant circuits to a desired FM carrier frequency. In other words, circuits 13, 13′ and 50, 51 are each tuned to the same FM carrier or center frequency of the FM signal range. One side of coil 13 is connected to the mid-point of coil 50 through the condenser 52. Those skilled in the art of FM reception are fully aware of the construction and functioning of a discriminator of the type shown in Fig. 8. For the purposes of the present application it is sufficient to point out that the discriminator effectively provides radio frequency voltages at deflection plates 5 and 6 respectively which have relative magnitudes dependent upon the frequency deviation of the received FM signals. In other words, the effect of the discriminator network is to provide radio frequency voltages at plates 5 and 6 which are equal at the center frequency, and unequal in a sense and to a degree dependent upon the direction and magnitude of frequency deviation of the signal eneregy relative to the center frequency $F_c$.

The output electrode or target T has the face thereof toward electron emitter 2 coated precisely as shown in Fig. 1. That, is, it is composed of alternate quadrants of different electron emission characteristics. Furthermore, the electrode E is to be understood as being constructed and biased precisely as in the case of Fig. 1. However, in Fig. 8 the opposite face of target T, that is the face towards electron emitter 2′, is free of any secondary emission surface. The target T in that case functions as the anode of an oscillator section with respect to the electron emitter 2′. Between the electron emitter 2′ and the target T there is located an electrode E′ which is constructed precisely in the same manner as shown for the electrode E. It is to be understood that the beam of electrons projected from emitter 2′ passes axially through the center opening of electrode E′ and falls upon the right-hand face of target T.

The electrode E′ is connected to ground through a path including the direct current blocking condenser 60 and the tank circuit coil 61. Tank circuit 32′ includes the tuning adjustment condenser 33′ in shunt across coil 61. The electron emitter 2′ is returned to an intermediate tap on coil 61 by lead 62, and the leak resistor 63 connects the upper terminal of condenser 60 to the lead 62. The target T is normally at a direct current voltage indicated by the +++ sign, as shown in Fig. 1, and is less positive than electrode E. The circuit 32′ is adjusted to the desired oscillation frequency, say 1000 kc., which as stated before will be the frequency to which each of circuits 21 and 40 respectively is tuned.

The electrodes 2′, E′ and T of beam tube 1′ cooperate to function as the oscillator section of the converter system, and the tank circuit 32′ corresponds to the tank circuit 32 of oscillator 30 in Fig. 1. The operation of the system in this modification is substantially the same as described in connection with Fig. 1. The difference resides in the fact that the potential of target T is varied directly at the high frequency of tank circuit 32′, whereas in Fig. 1 such variation of the potential of the target T resulted from oscillations on electrode E. However, the network 21, 40 will have developed across it, as in the case of Fig. 1, AM signals as explained in connection with Figs. 5, 6 and 7. These AM signals are utilized by the following AM receiver as described above.

While we have indicated and described several systems for carrying our invention into effect, it will be apparent to one skilled in the art that our invention is by no means limited to the particular organizations shown and described, but that many modifications may be made without departing from the scope of our invention.

What we claim is:

1. In a system of receiving frequency modulated carrier waves, circuit means for deriving from said waves a pair of high frequency voltages whose relative magnitudes vary in accordance with the instantaneous frequency deviations of the carrier waves relative to the center frequency thereof, a tube of the cathode ray type embodying an emitter of a stream of primary electrons, an output electrode positioned to receive said stream of primary electrons and provided with at least two areas of substantially different secondary electron emissivity, a highly positive electron collector electrode positioned to collect secondary electrons emitted from said areas, a resonant circuit connected with the output electrode, and means responsive to said pair of voltages for sweeping said stream of primary electrons over said two areas thereby to vary the width of pulses developed in the output electrode circuit.

2. In a system of receiving frequency modulated carrier waves, means for deriving from said waves a pair of high frequency voltages whose relative magnitudes vary in accordance with the instantaneous frequency deviations of the carrier waves relative to the center frequency thereof, a tube of the cathode ray type embodying an emitter of a stream of primary electrons, an output electrode positioned to receive said stream of primary electrons and provided with at least two areas of substantially different secondary electron emissivity, a highly positive electron collector electrode positioned to collect secondary electrons emitted from said areas, a resonant circuit connected with the output electrode, means responsive to said pair of voltages for sweeping said stream of primary electrons over said two areas thereby to vary the width of the pulses developed in the output electrode circuit, and means for varying the potential of said electron collector at a frequency which is less than the frequency of the carrier waves.

3. In a system for detection of frequency modulated carrier waves, means for deriving from said waves a pair of high frequency voltages whose relative magnitudes vary in accordance with the instantaneous frequency deviations of the carrier waves relative to the center frequency thereof, a tube of the cathode ray type embodying an emitter of a stream of primary electrons, an output electrode positioned to receive said stream of primary electrons and provided with two areas of substantially different secondary electron emissivity, a highly positive collector electrode positioned to collect secondary electrons emitted from said areas, means in circuit with the output electrode to develop high frequency pulses, means responsive to said pair of voltages for sweeping said stream of primary electrons over said two areas thereby correspondingly to vary the pulse widths, oscillatory means for cyclically varying the potential of said output electrode at a relatively low radio frequency, and means for applying the resulting amplitude modulated wave of said low radio frequency to a demodulator.

4. In a system for converting frequency modulated carrier waves, an emitter of a stream of primary electrons, an output electrode positioned to receive said stream of primary electrons and provided with at least two areas of substantially different secondary electron emissivity, a highly positive collector electrode positioned to collect secondary electrons emitted from said areas, a tuned network in a circuit with the output electrode, means responsive to frequency modulation of said waves for sweeping said stream of primary electrons over said two areas thereby to vary the width of the pulses developed in the output electrode circuit, and means varying the potential of the output electrode at a radio frequency.

5. In a system for converting frequency modulated carrier waves to variable-width high frequency pulses, means for deriving from said waves a pair of high frequency voltages whose relative magnitudes vary in accordance with the instantaneous frequency deviations of the carrier waves relative to the center frequency thereof, an emitter of a stream of primary electrons, an output electrode positioned to receive said stream of primary electrons and provided with at least two areas of substantially different secondary electron emissivity, a highly positive collector electrode positioned to collect secondary electrons emitted from said areas, a resonant system tuned to a predetermined high frequency in circuit with the output electrode, means responsive to said pair of voltages for sweeping said stream of primary electrons over said two areas, and a source of oscillations of said predetermined high frequency coupled to said collector electrode for varying the potential thereof.

6. In a system for converting frequency modulated carrier waves to variable-width pulses of high frequency current, means for deriving from said waves a pair of high frequency voltages whose relative magnitudes vary in accordance with the frequency deviations of the carrier waves relative to the center frequency thereof, an emitter of a stream of primary electrons, an output electrode positioned to receive said stream of primary electrons and provided with at least two areas of substantially different secondary electron emissivity, a highly positive collector electrode positioned to collect secondary electrons emitted from said areas, a resonant system tuned to said high frequency and in circuit with the output electrode, means responsive to said pair of voltages for sweeping said stream of primary electrons over said two areas, a source of oscillations of said high frequency coupled to said output electrode for varying the potential thereof, said oscillation source including said output electrode as an electrode of the oscillatory system.

7. A method of signal reception wherein frequency modulation signals are amplified and detected in an amplitude modulation receiver, which consists in deriving from the frequency modulation signals high frequency pulses having a pulse rate equal to the carrier frequency of the signals and a pulse width dependent on the modulation of the signals, amplitude modulating a lower frequency carrier with said variable-width pulses, deriving from the last step a resultant amplitude modulated carrier of said lower frequency wherein the modulation is the average of said pulses, and applying the resultant modulated carrier to said amplitude modulated receiver.

8. In a system for converting frequency modulated carrier waves, means for deriving from said waves a pair of high frequency voltages whose relative magnitudes vary in accordance with the frequency swings of the carrier waves, an emitter of a stream of primary electrons, an output electrode positioned to receive said stream of primary electrons and provided with at least two areas of substantially different secondary electron emissivity, a collector electrode positioned to collect secondary electrons emitted from said areas, a resonant system tuned to a radio frequency lower than said carrier frequency and in circuit with the output electrode, electron deflecting means responsive to said pair of voltages for sweeping said stream of primary electrons over said two areas, and means coupled to said collector electrode for varying the potential thereof at said lower radio frequency.

GEORGE C. SZIKLAI.
SARKES TARZIAN.

REFERENCES CITED

The following references are of record in the file of this patent:

UNITED STATES PATENTS

| Number | Name | Date |
|---|---|---|
| 2,086,918 | Luck | July 13, 1937 |
| 2,181,170 | Brown | Nov. 28, 1939 |
| 2,202,376 | Hansell | May 28, 1940 |
| 2,245,364 | Reisz et al. | June 10, 1941 |
| 2,262,406 | Rath | Nov. 11, 1941 |
| 2,262,407 | Rath | Nov. 11, 1941 |
| 2,344,679 | Crosby | Mar. 21, 1944 |
| 2,383,855 | Hansell | Aug. 28, 1945 |
| 2,408,702 | Sziklai | Oct. 1, 1946 |